United States Patent
Kobayashi et al.

(10) Patent No.: US 8,226,302 B2
(45) Date of Patent: Jul. 24, 2012

(54) OPTICAL CONNECTOR

(75) Inventors: Masaru Kobayashi, Atsugi (JP); Ryo Nagase, Atsugi (JP); Yoshiteru Abe, Tsukuba (JP); Yuichi Koreeda, Tokyo (JP)

(73) Assignees: Nippon Telegraph and Telephone Corporation, Tokyo (JP); Japan Aviation Electronics Industry, Limited, Tokyo (JP)

( * ) Notice: Subject to any disclaimer, the term of this patent is extended or adjusted under 35 U.S.C. 154(b) by 133 days.

(21) Appl. No.: 12/440,428

(22) PCT Filed: Sep. 5, 2007

(86) PCT No.: PCT/JP2007/067317
§ 371 (c)(1),
(2), (4) Date: Apr. 13, 2010

(87) PCT Pub. No.: WO2008/029850
PCT Pub. Date: Mar. 13, 2008

(65) Prior Publication Data
US 2010/0226610 A1    Sep. 9, 2010

(30) Foreign Application Priority Data
Sep. 6, 2006    (JP) ................................. 2006-241941

(51) Int. Cl.
*G02B 6/38*    (2006.01)
(52) U.S. Cl. .......................................... 385/58; 385/60
(58) Field of Classification Search ...................... 385/58
See application file for complete search history.

(56) References Cited

U.S. PATENT DOCUMENTS

| 4,045,121 | A | * | 8/1977 | Clark ............................. | 385/58 |
| 5,537,501 | A | * | 7/1996 | Iwano et al. .................... | 385/58 |
| 6,485,192 | B1 |   | 11/2002 | Plotts et al. |  |
| 6,491,442 | B1 | * | 12/2002 | Murakami et al. ............. | 385/58 |
| 2002/0131718 | A1 | * | 9/2002 | Tsuchida et al. ............... | 385/55 |
| 2006/0147156 | A1 | * | 7/2006 | Tsuchida et al. ............... | 385/71 |

FOREIGN PATENT DOCUMENTS

| JP | 2001-141964 | 5/2001 |
| JP | 2001-305385 | 10/2001 |
| JP | 2002-505016 | 2/2002 |
| JP | 2002-082254 | 3/2002 |
| JP | 2003-521730 | 7/2003 |

OTHER PUBLICATIONS

Office Action issued on Mar. 23, 2010 in a corresponding Chinese Patent Application No. 200780033231.0.
PCT Notification of Transmittal of Translation of the International Preliminary Report on Patentability (Chapter I or Chapter II of the Patent Cooperation Treaty) of related Japanese Application No. PCT/JP2007/067317, dated Mar. 26, 2009 (5 pages).

* cited by examiner

*Primary Examiner* — Mark Robinson
*Assistant Examiner* — Andrew Jordan
(74) *Attorney, Agent, or Firm* — Workman Nydegger

(57) ABSTRACT

An optical connector (10) of the present invention includes housing position correction means for correcting displacement of relative positions between plug and jack housings (13, 16); housing connection means (20, 22) which engage with each other to connect the plug and jack housings (13, 16) to each other so that a coupling state between first and second optical fibers (11, 14) can be maintained; connection release means (26, 27) capable of releasing the connected state by the housing connection means (20, 22); and frame position correction means for correcting displacement of relative positions between a frame (21) of an optical plug (12) and a connection block (34) of an optical jack (15).

9 Claims, 11 Drawing Sheets

OPTICAL CONNECTOR

TECHNICAL FIELD

The present invention relates to a PC-connectable optical connector for optical communications, and more particularly is suitable as a plug-in type optical connector attached to a board member.

BACKGROUND ART

As one of optical connectors, which connect optical fibers to each other, a FPC (Fiber Physical Contact) connector is known as disclosed in a 16-core FPC connector with a shutter utilizing a MU coupling structure (C-3-120, 2003 Electronics Society Conference, the Institute of Electronics, Information and Communication Engineers). The appearance of the FPC connector is schematically illustrated in FIG. 9, and its connected state is illustrated in FIG. 10. Specifically, a FPC connector 1 includes an optical jack 3 into which optical fibers 2 on one side are drawn and an optical plug 5 into which optical fibers 4 on the other side are drawn. A connection block 6 is provided in the optical jack 3. The connection block 6 has micro holes, namely, connection holes 6a, each with an inner diameter (for example, 126 μm when the optical fiber has an outer diameter of 125 μm) slightly larger than an outer diameter (normally, 125 μm) of the optical fibers 2 and 4. The optical fibers 2 are inserted into the connection holes 6a from the base end side of the connection block 6. The optical fibers 4, which are placed on the optical plug 5 side and are to be inserted into the connection holes 6a from the tip end side of the connection block 6, are held in advance so as to project from a butting surface 5a of the optical plug 5 which is to butt against a butting surface 3a of the optical jack 3. When the butting surface 5a of the optical plug 5 butts against that of the optical jack 3 to thereby make connection therebetween, the optical fibers 4 on the other side held by the optical plug 5 come into contact with the optical fibers 2 on the one side held by the optical jack 3. The contact takes place in the connection holes 6a of the connection block 6 of the optical jack 3. Then, the optical fibers 4 on the other side are bent in the optical plug 5 by a buckling stress generated at this time. An elastic force generated by bending of the optical fibers 4 on the other side provides a PC state in which end surfaces 2a and 4b of the optical fibers 2 and 4 on both sides are in pressure contact with each other.

Additionally, in order to achieve the aforementioned PC connection, a free length of the bendable and deformable optical fiber 4 on the connection end side, the optical fiber 4 being placed on the optical plug 5 side, is set to, for example, 8 mm, and an extra length is set to, for example, 30 μm. Moreover, the buckling stress, which acts on the optical fiber 4 at the time of PC connection, is set to, for example, 50 grams.

In FIG. 11, the appearance of a multi-core optical connector utilizing the principle of the aforementioned FPC connector is illustrated in a partially broken state. An optical connector 100 is based on the coupling structure of a duplex-core F14 (JIS C 5983) type, that is, a MU (Miniature Unit-coupling) type optical connector disclosed in the structure and characteristics of a high-density multi-core plug-in optical connector having a self hold function (EMC91-39, 1991, Technical Report, the Institute of Electronics, Information and Communication Engineers). In the optical connector 100, an optical jack 200 and an optical plug 300 are coupled to each other through an optical adaptor 400. The frame-shaped optical adaptor 400 is provided with a guide member 401 projecting for defining the relative positions of the optical jack 200 and the optical plug 300 with respect to the optical adaptor 400. Correspondingly, guide grooves 201 and 301, which are engaged with the guide member 401, are formed in the optical jack 200 and the optical plug 300, respectively. This makes it possible to individually attach and detach the optical jack 200 and the optical plug 300 to and from the optical adaptor 400.

In an optical communication apparatus, an optical connection system has been demanded in which a board member such as a package substrate is moved relative to a backplane to thereby automatically insert and withdraw optical fibers attached to the backplane and optical fibers attached to the board member.

However, the optical adaptor 400 of the conventional MU optical connector 100 illustrated in FIG. 11 cannot be directly used in the backplane of the optical communication apparatus in order to produce the FPC connector functioning in the above-descried optical connection system. As a result, a minimum contrivance is needed, for example, the optical adaptor 400 is divided into two and one is attached to the backplane and the other is attached to the board member. However, it is revealed that there are many other problems to be overcome.

DISCLOSURE OF THE INVENTION

The present invention has been made in view of the aforementioned circumstances, and an object of the present invention is to provide an optical connector which allows PC connection and disconnection of optical fibers by an insertion and withdraw operation between board members such as a backplane and a package substrate in an optical communication apparatus.

An optical connector of the present invention includes an optical plug to which a first optical fiber is connected, a plug housing to which the optical plug is removably attached, an optical jack to which a second optical fiber is connected, the second optical fiber being connected to the first optical fiber in a butting state, and a jack housing to which the optical jack is removably attached, the jack housing being detachably connected to the plug housing. The optical plug has a box-shaped frame that houses a coupling end portion of the first optical fiber in a surrounding manner. The optical jack includes a connection block having a connection hole which houses and holds a coupling end portion of the second optical fiber on a base end side, and into which the first optical fiber is inserted from a tip end side. The first optical fiber is bent in the frame when the first optical fiber and the second optical fiber are connected together. The optical connector is characterized by including: housing position correction means, which are provided in the plug housing and the jack housing, for correcting displacement of relative positions therebetween; housing connection means which are provided in the plug housing and the jack housing, and which engage with each other to connect the plug housing and the jack housing to each other so that a coupling state between the first optical fiber and the second optical fiber can be maintained; connection release means which is formed in at least one of the plug housing and the jack housing, and which is capable of releasing the connected state by the housing connection means; and frame position correction means, which are provided in an inner side of the frame of the optical plug and on the connection block of the optical jack, for correcting displacement of relative positions therebetween.

In the present invention, when the plug housing to which the optical plug is attached is connected to the jack housing to which the optical jack is attached, displacement of relative positions therebetween is corrected by the housing position correction means. Moreover, displacement of relative positions between the frame of the optical plug and the connection block of the optical jack is corrected by the frame position correction means. As a result, the coupling end portion of the first optical fiber held by the frame of the optical plug is inserted into the connection hole from the tip end side of the connection hole of the connection block of the optical jack. Then, the first optical fiber pushes against the second optical fiber housed on the base end side of the connection hole, and a PC coupling state is achieved. This state is held by the housing connection means, but the connection release means is operated to thereby allow the plug housing and the jack housing to be separated from each other, so that the first optical fiber and the second optical fiber are in an uncoupling state.

According to the optical connector of the present invention, the plug housing and the jack housing can be accurately connected to each other by the housing position correction means when the first optical fiber and the second optical fiber are coupled together. Further, it is possible to more accurately position the frame of the optical plug and the connection block of the optical jack by the frame position correction means. As a result, the optical fiber can be surely inserted into the connection hole of the connection block of the optical jack to make it possible to maintain the PC connection state with high reliability.

In the optical connector of the present invention, the connection block may be housed in the frame of the optical plug together with the frame position correction means, when the optical plug is connected to the optical jack, whereby the first optical fiber is inserted from the tip end side of the connection hole.

As the housing position correction means, one of the plug housing and the jack housing may have first inclined surfaces which extend along a first direction perpendicular to a direction where the plug housing and the jack housing are attached to and detached from each other and which are positioned more outwardly as they come closer to the tip end side, and second inclined surfaces which extend along a second direction perpendicular to the first direction and to the direction where the plug housing and the jack housing are attached to and detached from each other and which are positioned more outwardly as they come closer to the tip end side. The other of the plug housing and the jack housing may have third inclined surfaces which correspond to the first inclined surfaces and which are positioned more inwardly as they come closer to the tip end side, and fourth inclined surfaces which correspond to the second inclined surfaces and which are positioned more inwardly as they come closer to the tip end side.

The frame position correction means may have a pair of position correction members which are formed integrally with the connection block, and which are fitted into the inner side of the frame. Tip ends of these position correction members may have: fifth inclined surfaces, which extend along a first opening end edge of the frame, and which are positioned more inwardly as they come closer to the tip end side; and sixth inclined surfaces, which extend along a second opening end edge perpendicular to the first opening end edge, and which are positioned more inwardly as they come closer to the tip end side.

It is preferable that a facing distance between the housing position correction means which are respectively formed in the plug housing and the jack housing be set to be shorter than a facing distance between the frame position correction means which are respectively formed in the optical plug and the optical jack. In this case, when the first optical fiber and the second optical fiber are coupled together, the relative positions between the plug housing and the jack housing is roughly corrected. Then, the frame of the optical plug and the connection block of the optical jack can be more accurately positioned.

The optical jack can further include a frame which holds the frame position correction means together with the connection block, and positioning means for defining relative positions between the housing position correction means and the frame position correction means of the optical jack. In this case, the relative position of the frame position correction means with respect to the housing position correction means of the optical jack can be accurately defined to make it possible to achieve a stable connected state with high reliability.

One of the plug housing and the jack housing can be fixed to a backplane, and the other can be fixed to a board member. Particularly, it is preferable that the plug housing be fixed to the backplane, and that the jack housing be fixed to the board member. In this case, it is possible to achieve a plug-in connection of the optical connector between a backplane and a board member such as a package substrate. Particularly, when the plug housing is fixed to the backplane and the jack housing board is fixed to the board member, it is possible to carry the board member to a location where a good workability is obtained. As a result, it is possible to facilitate maintenance and the like of the connection end surface of the second optical fiber attached to the optical jack.

BEST MODES FOR CARRYING OUT THE INVENTION

Specific description will be given of an embodiment of the present invention with reference to FIGS. 1 to 8. An optical connector of the present invention is of a plug-in type and attached to a board member. However, the present invention is not limited to this embodiment, and it is needless to say that the present invention can be applied to any other technologies included within the spirit of the present invention.

Figure 1:
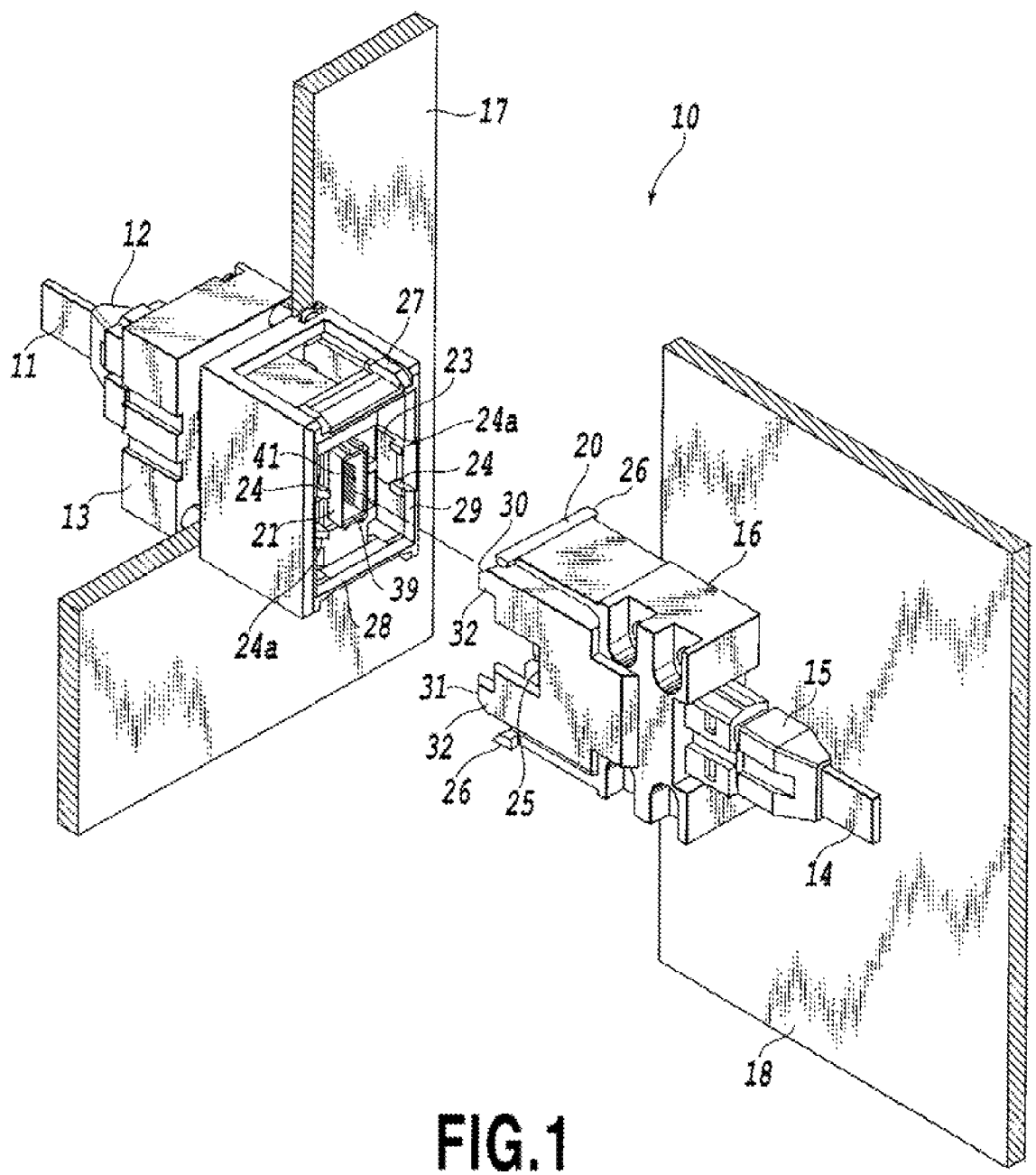
FIG. 1 is an isometric view illustrating an appearance of an optical connector according to one embodiment of the present invention and shows a separated state.
Figure 2:
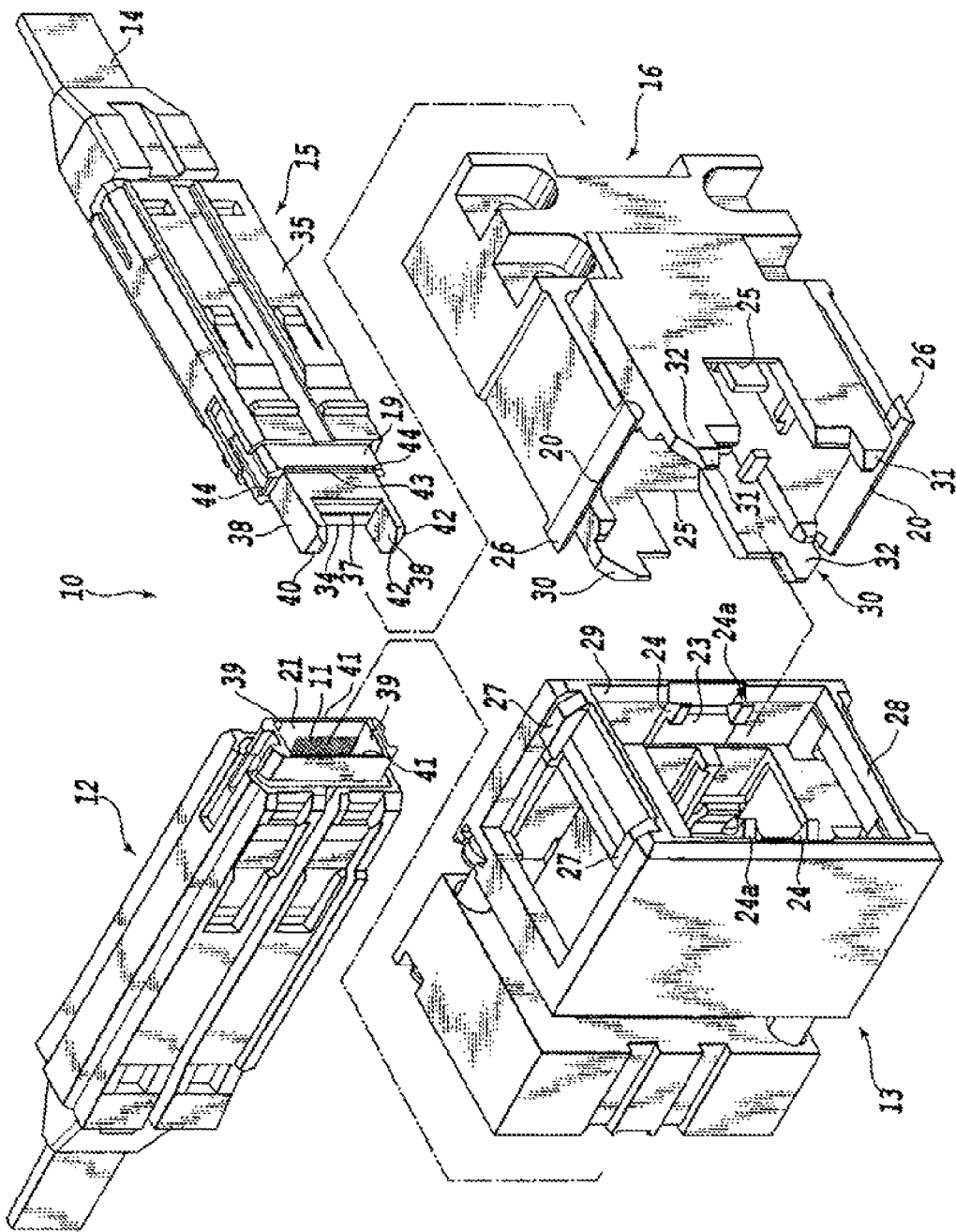
FIG. 2 is an isometric view illustrating an enlarged appearance of exploded main parts of the optical connector illustrated in FIG. 1.
Figure 3:
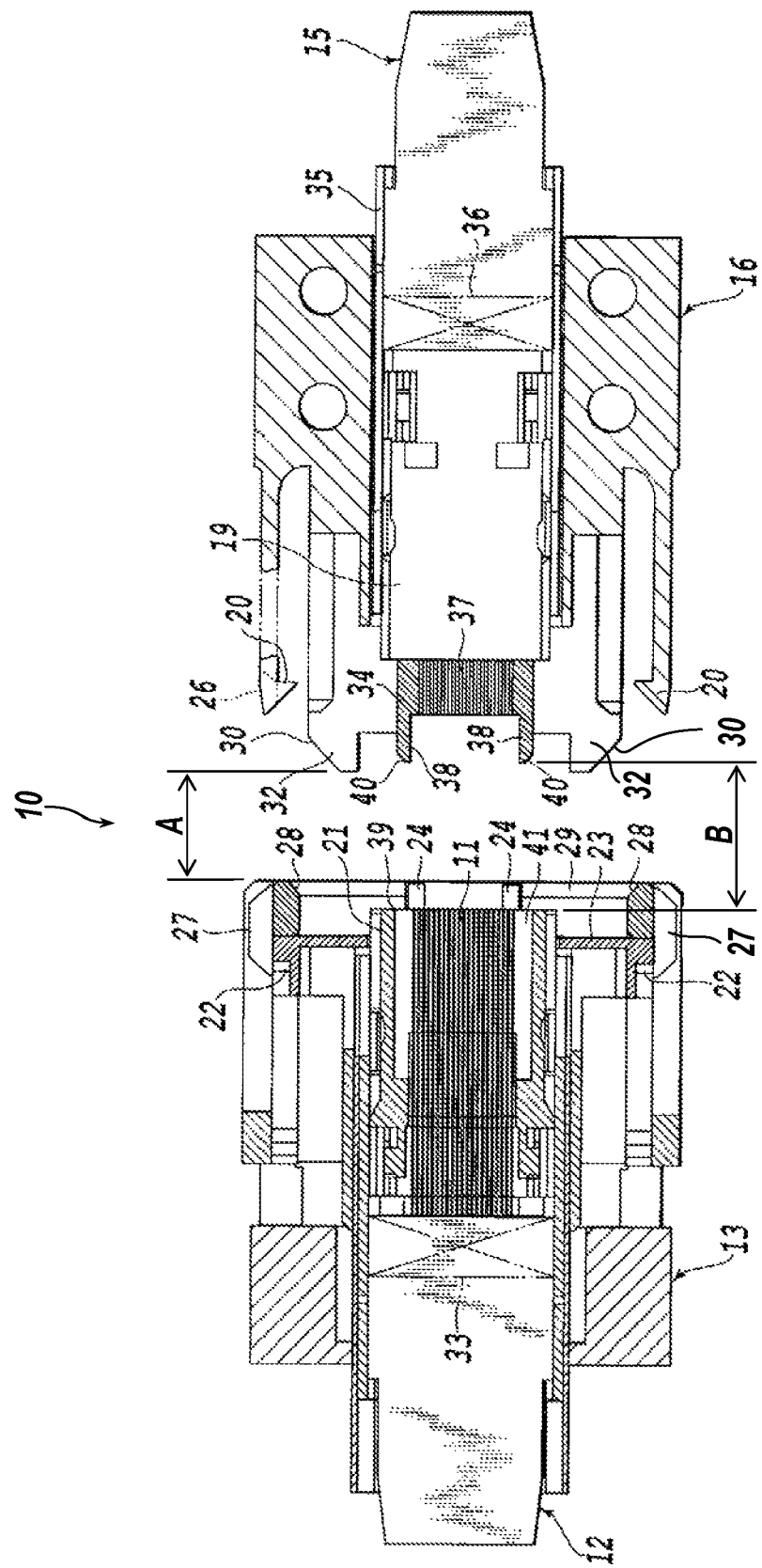
FIG. 3 is a cross-sectional view schematically illustrating an internal structure of the optical connector illustrated in FIG. 1 and shows a non-connected state.
Figure 4:
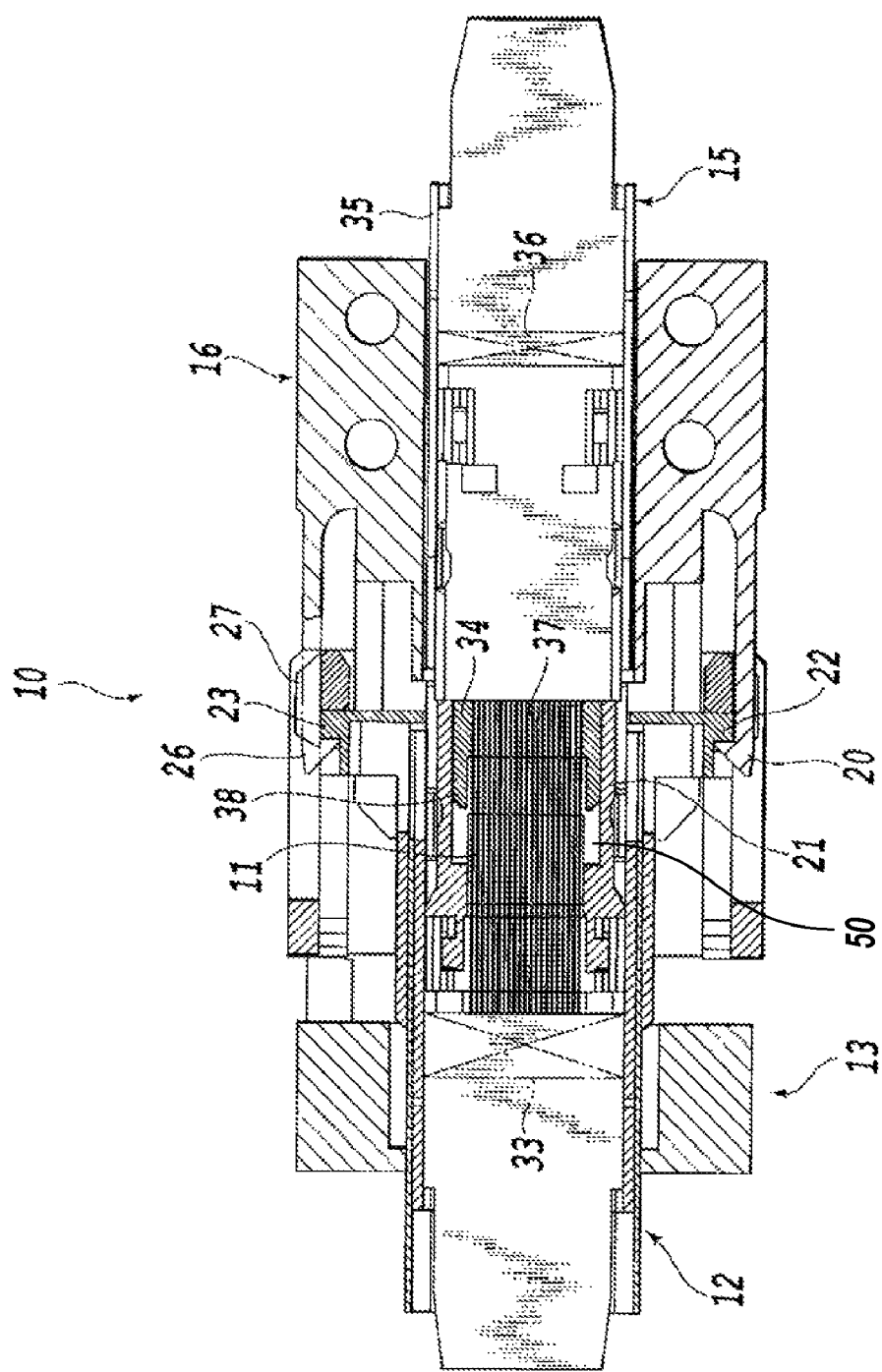
FIG. 4 is a cross-sectional view schematically illustrating the internal structure of the optical connector illustrated in FIG. 1 and shows a connected state.

FIG. 1 illustrates an appearance of an optical connector of the present embodiment. FIG. 2 illustrates an enlarged appearance of exploded main parts thereof. FIG. 3 illustrates its cross sectional structure in a non-coupling state. FIG. 4 illustrates its cross sectional structure in a coupling state. An optical connector 10 in the present embodiment includes an optical plug 12 to which first optical fibers 11 are connected, a plug housing 13 to which the optical plug 12 is removably attached, an optical jack 15 to which second optical fibers 14 are connected, and a jack housing 16 to which the optical jack 15 is removably attached. The plug housing 13 and the jack housing 16 are detachably connected to each other. The first fibers 11 of the optical plug 12 and the second fibers 14 of the optical jack 15 achieve PC connection through the plug housing 13 and the jack housing 16 while butting against one another. In the present embodiment, the plug housing 13 is attached to a backplane 17, and the jack housing 16 is fixed to a package substrate 18. However, the attachment relationship therebetween may be reversed as required. The package substrate 18 is moved relatively to the backplane 17, thereby allowing connection and disconnection between the optical plug 12 and the optical jack 15. For this reason, on a non-illustrated rack on which an optical communication apparatus having the aforementioned backplane 17 is mounted, a pair of upper and lower rails is provided which extends in a direction facing the package substrate 18, namely, a direction where the optical jack 15 is attached to and detached from the optical plug 12. The package substrate 18 is movable in a direction facing the backplane 17 along the pair of upper and lower guide rails. The package substrate 18 can be fixed to the backplane 17 by non-illustrated lock means. In this state, the first optical fibers 11 and the second optical fibers 14 described above are coupled together.

It is noted that, in the present embodiment, sixteen optical fibers 11 and sixteen optical fibers 14 are connected to the optical plug 12 and the optical jack 15, respectively. Coupling end portions of these are arranged in parallel with one another at constant intervals.

In order to connect and disconnect the plug housing 13 and the jack housing 16, housing connection means, which are engaged with each other, are provided in the plug housing 13 and the jack housing 16 to hold a connected state therebetween. This maintains the PC coupling state between the first optical fibers 11 and the second optical fibers 14. Moreover, connection release means, which is capable of releasing the connected state made by the housing connection means, is provided in at least one of the plug housing 13 and the jack housing 16.

The housing connection means in the present embodiment includes: a pair of upper and lower locking hooks 20, which are projected to a frame 19 of the optical jack 15, and which have tip end portions elastically deformable in a vertical direction of FIG. 4; and a pair of upper and lower hook locking portions 22 which are formed on a frame 21 of the optical plug 12 to allow the tip end portions of these paired locking hooks 20 to be locked. These hook locking portions 22 are formed on tip end sides of frame-shaped sliders 23, which are slidably fitted into the plug housing 13 in its longitudinal direction (direction parallel to a direction where the optical plug 12 is attached to and detached from the plug housing 13). Each slider 23 has non-illustrated engaging portions that are engaged with a part of a sliding surface between the slider 23 and the plug housing 13 so as to snap-fasten the plug housing 13 at its forward end. Moreover, in order to release the engaged state of the engaging portions, a pair of hook portions 24 for releasing engagement is provided in a protruding condition on right and left sides of the front end portions of the sliders 23, respectively. The hook portions 24 have such inclined surfaces 24a that gradually separate from an inner wall surface of the plug housing 13 toward the tip end side. The hook portions 24 are elastically deformable in right and left directions, that is, in directions separating from the inner wall surface of the plug housing 13. In right and left side walls of the jack housing 16, notch portions 25 are formed which butt against these inclined surfaces 24a to elastically deform the hook portions 24 inwardly, thereby allowing the engaged state between the engaging portions to be released.

To put it differently, when the plug housing 13 and the jack housing 16 are fitted into each other to connect them, the hook portions 24 butt against the notch portions 25, and the hook portions 24 of the sliders 23 elastically deform inwardly so as to be separated from the inner wall of the plug housing 13. By this means, the engaged state between the plug housing 13 and the engaging portions of the sliders 23 is released, so that the sliders 23 are pressed by the jack housing 16 and can retreat inside the plug housing 13.

Further, the connection release means in the present embodiment has cam blocks 26, which are provided in a protruding condition on right and left end portions of the locking hooks 20, respectively, and trapezoidal cam followers 27 which the cam blocks 26 butt against. The cam followers 27 are formed on side end portions of the plug housing 13. The cam blocks 26 move along the cam followers 27 with the attachment and detachment operation of the jack housing 16 to and from the plug housing 13. This enables the cam blocks 26 to displace the locking hooks 20 so as to separate from the plug housing 13 in upper and lower directions with elastic deformation of the lack hooks 20. When the jack housing 16 is fitted onto the plug housing 13 to connect them, the cam blocks 26 ride on the cam followers 27, and elastic deformation of the locking hooks 20 is started. Then, at the point when the cam blocks 26 pass the cam followers, the elastic deformation of the locking hooks 20 is stopped, and the locking hooks 20 are locked by the hook locking portions 22 of the sliders 23. At this time, stress, which is generated at the time of fitting, is instantaneously transmitted to the backplane 17. However, each slider 23 having the hook locking portion 22 formed is in a floating condition away from the plug housing 13. Therefore, the stress, which is generated at the time of fitting, can be prevented from being continuously loaded on the back plate 17.

When no withdrawal force of a predetermined value or greater acts on the package substrate 18, the locked state between the locking hooks 20 and the hook locking portions 22 is maintained, and the plug housing 13 and the jack housing 16 are integrally connected to each other. However, when the withdrawal force of a predetermined value or greater acts on the package substrate 18, the cam blocks 26 ride on the cam followers 27 again, so that the locking hooks 20 elastically deform to be detached outside from the hook locking portions 22. As a result, it is possible to withdraw the jack housing 16 from the plug housing 13. Further, the sliders 23 are returned to an initial position in this withdrawal process, and the engaging portions of the sliders 23 and those of the plug housing 13 are engaged with one another.

In addition, it is possible to reversely set the structures of the housing connection means and the connection release means in the plug housing 13 and the jack housing 16.

When the package substrate 18 is operated to connect the plug housing 13 and the jack housing 16 to each other, relative positions between the plug housing 13 and the jack housing 16 are not accurately matched in general. For this reason, in the plug housing 13 and the jack housing 16, housing position correction means are provided for correcting displacement of the relative positions therebetween. Even when the jack housing 16 is displaced vertically and horizontally by approximately, for example, 2 mm, from the plug housing 13 and slightly inclined, the housing position correction means in the present embodiment can connect them reliably. To be more specific, an opening end portion of the plug housing 13 has first inclined surfaces 28 which are positioned more outwardly as they come closer to the tip end side, and second inclined surfaces 29 which are positioned more outwardly as they come closer to the tip end side. The first inclined surfaces 28 extend along a first direction perpendicular to a direction where the plug housing 13 and the jack housing 16 are attached to and detached from each other. The second inclined surfaces 29 extend along a second direction perpendicular to the first direction and to the direction where the plug housing 13 and the jack housing 16 are attached to and detached from each other. In the present embodiment, the first inclined surfaces 28 are formed on a pair of upper and lower opening edges of the rectangular-frame-shaped plug housing 13. Moreover, the second inclined surfaces 29 are formed on a pair of right and left opening edges of the plug housing 13. An opening end portion of the jack housing 16 has third inclined surfaces 30 which are positioned more inwardly as they come closer to the tip end side, and fourth inclined surfaces 31 which are positioned more inwardly as they come closer to the tip end side. The third inclined surfaces 30 correspond to the first inclined surfaces 28, and the fourth inclined surfaces 31 correspond to the second inclined surfaces 29. The third and fourth inclined surfaces 30 and 31 in the present embodiment are formed on tip end portions of guide blocks 32 protruding at four corners of the rectangular-frame-shaped jack housing 16. Then, these guide blocks 32 are slidingly fitted into and brought into contact with the inner wall of the plug housing 13, thereby accurately positioning the jack housing 16 with respect to the plug housing 13.

As described above, the optical plug 12 has the box-shaped frame 21, which houses the coupling end portions of the first optical fibers 11 so as to surround the coupling end portions. The frame 21 is held slidably in its longitudinal direction in the optical plug 12. A spring mechanism 33, which urges the frame 21 forward, is also incorporated in the optical plug 12.

Figure 5:
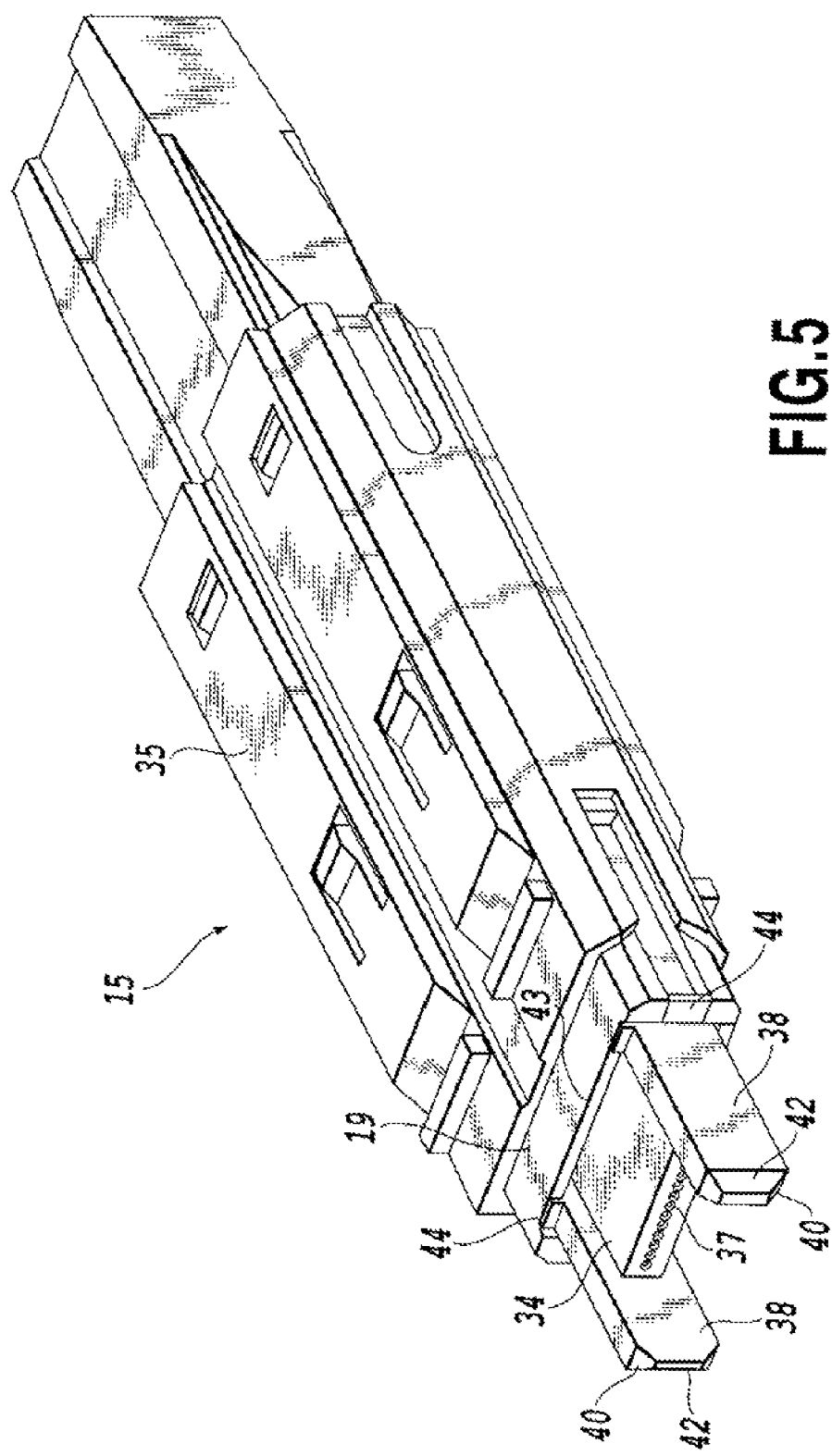
FIG. 5 is an isometric view illustrating an enlarged appearance of an optical jack in the optical connector illustrated in FIG. 1.
Figure 6:
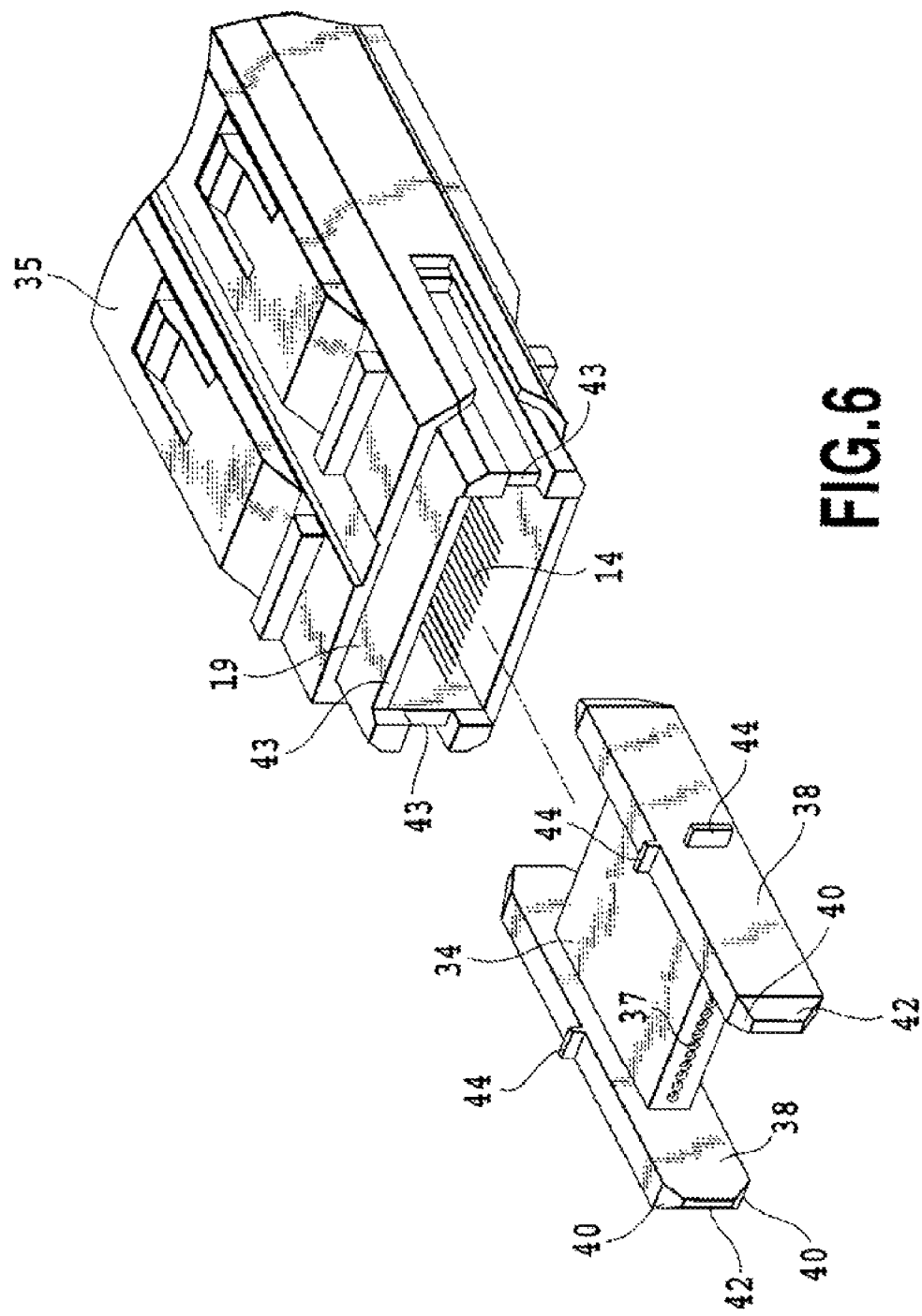
FIG. 6 is an isometric view illustrating an exploded tip end portion of the optical jack illustrated in FIG. 5.

FIG. 5 illustrates the enlarged optical jack 15 in the present embodiment, and FIG. 6 illustrates the exploded optical jack 15 at a connection block 34. The optical jack 15 in the present embodiment has the box-shaped frame 19, a main body 35, a spring mechanism 36 which urges the frame 19 forward, and the connection block 34. The frame 19 houses the coupling end portions of the second optical fibers 14 so as to surround the coupling end portions. The main body 35 holds the frame slidably in its longitudinal direction (direction in parallel with an insertion and withdrawal direction of the optical jack 15). The spring mechanism 36 is provided between the main body 35 and the frame 19. On the connection block 34 fitted into the tip end portion of the frame 19, connection holes 37 are formed for inserting the first and second optical fibers 11 and 14 from both sides thereof. The coupling end portions of the second optical fibers 14 are housed and held in advance on base end sides of the connection holes 37 formed on the connection block 34. The connection block 34 is housed in the frame 21 of the optical plug 12 when the optical plug 12 and the optical jack 15 are connected to each other. By this means, the first optical fibers 11 are inserted from the tip end sides of the connection holes 37, so that the first and the second optical fibers 11 and 14 can butt against one another in the interior of each connection hole 37. In the coupling state between the first optical fibers 11 and the second optical fibers 14, the first optical fibers 11 are bent in the frame 21 of the optical plug 12 to thereby achieve a PC state. The coupling state is held by spring forces of the spring mechanisms 33 and 36. More specifically, in the connected state between the plug housing 13 and the jack housing 16, the opening end surface of the frame 21 of the optical plug 12 and that of the frame 19 of the optical jack 15 push against each other with the spring mechanisms 33 and 36 while being compressed. Then, the spring forces of the spring mechanisms 33 and 36, which are generated when the frames 21 and 19 are retreated, hold the opening end surfaces of the frames 21 and 19 in close contact with each other.

Even when the plug housing 13 and the jack housing 16 are accurately connected to each other by the aforementioned housing position correction means, it is difficult to accurately fit the first optical fibers 11 of the optical plug 12, which is attachable to and detachable from the plug housing 13, into the connection holes 37 of the connection block 34 of the optical jack 15 which is attachable to and detachable from the jack housing 16. For this reason, in the inner side of the frame 21 of the optical plug 12 and on the connection block 34 of the optical jack 15, frame position correction means are provided to correct displacement of relative positions therebetween. The frame position correction means provided in the optical jack 15 in the present embodiment include a pair of position correction members 38 which are formed integrally with the connection block 34, and which are fitted into the inner side of the frame 19. The tip ends of the position correction members 38 have fifth inclined surfaces 40 which are positioned more inwardly as they come closer to the tip end side, and sixth inclined surfaces 42 which are positioned more inwardly as they come closer to the tip end side. The fifth inclined surfaces 40 extend along a first opening end edge 39 of the frame 21. The sixth inclined surfaces 42 also extend along a second opening end edge 41 perpendicular to the first opening end edge 39.

Therefore, even if the relative positions between the optical plug 12 and the optical jack 15 are slightly displaced when the first optical fibers 11 and the second optical fibers 14 are coupled together, the fifth and/or the sixth inclined surfaces 40 and 42 of the position correction members 38 butt against the first opening end edge 39 and/or the second opening end edge 41 of the frame 21 of the optical plug 12. Next, the position correction members 38 are automatically guided to the inner side of the frame 21 of the optical plug 12 with generation of a pushing force of the jack housing 16, and the position correction members 38 and the connection block 34 are fitted into the frame 21 of the optical plug 12. Thereby, accurate positioning between the optical plug 12 and the optical jack 15 is achieved.

The above-described position correction members 38 are integrally fixed to the frame 19 of the optical jack 15 together with the connection block 34. The position correction members 38 have positioning projections 44 capable of locking notches 43 formed on the opening end portion of the frame 19, in order to accurately define the position relative to the above-described locking hooks 20. In other words, the notches 43 and the positioning projections 44 function as positioning means of the present invention.

As shown in FIG. 3, a facing interstice A between the housing position correction means of the plug housing 13 and that of the jack housing 16 is set to be shorter than a facing interstice B between the frame position correction means of the optical plug 12 and that of the optical jack 15. As a result, when the package substrate 18 is moved toward the backplane 17, a displacement of relative positions between the plug housing 13 and the jack housing 16 is first coarsely corrected. Then, a very small displacement of relative positions between the frame 21 of the optical plug 12 and the position correction member 38 of the connection block 34 of the optical jack 15 is finely corrected.

It is noted that the above-described connection block 34 and the position correction members 38 are formed as resin molded products, thereby making it possible to manufacture them at low cost. More specifically, the inclined surfaces 40 and 42 for positioning are integrally formed on the position correction members 38 or the positioning projections are integrally formed on the frame 19, and thereby positioning accuracy requested for the PC connection can be obtained. Also, in the optical plug 12 and the optical jack 15, non-illustrated protection shutter mechanisms, which cover the tip end portions thereof, are incorporated. The shutter mechanisms automatically open and close the shutter in synchronism with attachment and detachment operations of the optical plug 12 and the optical jack 15.

When the optical connector 10 is connected, the package substrate 18 is moved along non-illustrated rails in a way that the package substrate 18 comes close to the backplane 17 from the state illustrated in FIG. 3. When the jack housing 16 is displaced from the plug housing 13, the third inclined surface 30 and/or the fourth inclined surface 31 of the jack housing 16 firstly butt against the first inclined surface 28 and/or the second inclined surface 29 of the plug housing 13. Then, the position of the jack housing 16 relative to the plug housing 13 is corrected by utilizing sliding generated among the inclined surfaces 28 to 31. As a result, the side wall portions of the jack housing 16 enter the inner side of the side wall portions of the plug housing 13.

In the middle of this operation, the connection block 34 and the position correction members 38 of the optical jack 15 enter the frame 21 of the optical plug 12. When the positions of these parts are displaced, the fifth and/or the sixth inclined surfaces 40 and 42 on the tip ends of the position correction members 38 butt against the first and/or the second opening end edges 39 and 41 inside the frame 21 of the optical plug 12. Then, by utilizing sliding generated thereamong, the positions of the connection block 34 and the position correction members 38 the optical jack 15 relative to the frame 21 of the optical plug 12 are corrected. As a result, the position correction members 38 enter the frame 21 while sliding and coming into contact with the inner wall of the frame 21.

Figure 7:
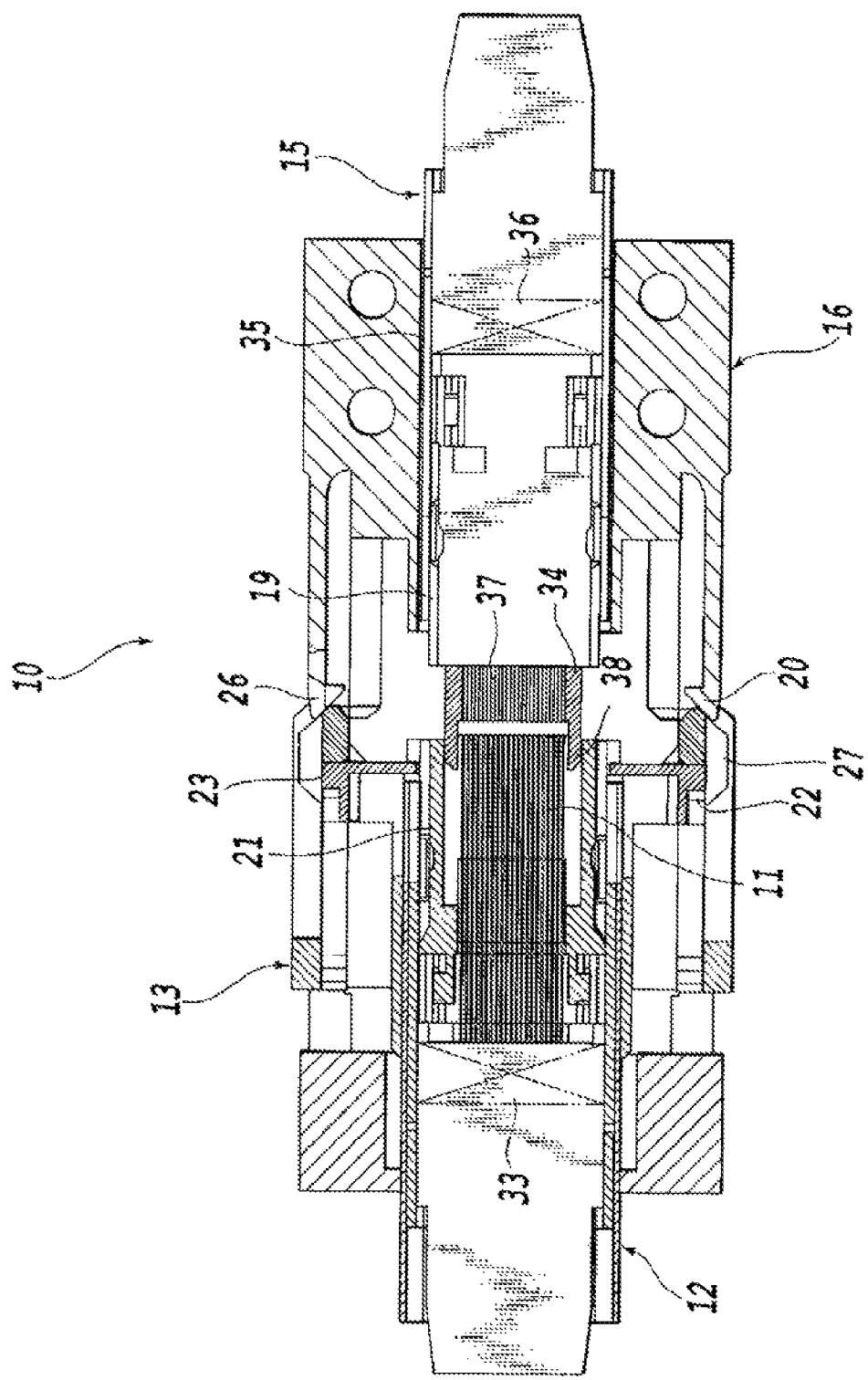
FIG. 7 is a cross-sectional view schematically illustrating the internal structure of the optical connector illustrated in FIG. 1 and shows a middle state of connection or separation.

Further, before the tip end surface of the connection block 34 reaches the first optical fibers 11 of the optical plug 12, the cam blocks 26, which are placed on both sides of the locking hooks 20 provided in the jack housing 16, butt against the cam followers 27 formed in the plug housing 13 (see FIG. 7). Then, the tip end portions of the locking hooks 20 are vertically opened and elastically deformed by the cam followers 27. Thereafter, the notch portions 25 formed on the side wall portions of the jack housing 16 butt against the hook portions 24 of the sliders 23. As a result, the opening end portions of the sliders 23 are elastically deformed inwardly in a horizontal direction, and the engaged state of the engaging portions formed on the sliders 23 and the plug housing 13 is released. After that, the sliders 23 are pushed into the plug housing 13 deeply together with the jack housing 16. It should be noted that this means no pushing force from the package substrate 18 directly acts on the plug housing 13 connected to the backplane 17.

In the middle of this operation, the first optical fibers 11 of the optical plug 12 are guided into the connection holes 37 of the connection block 34, and butt against the tip ends of the second optical fibers 14. As a result, portions of the first optical fibers 11 begin to bend into the space 50 (FIG. 4) between the connection block 34 and the frame 21. After that, when the cam blocks 26 ride over the cam followers 27, the locking hooks 20 are engaged with the hook locking portions 22 of the sliders 23 to complete connection of the optical connector 10.

Under this state, the relative positions between the backplane 17 and the package substrate 18 are fixed by non-illustrated lock means. The tip end surface of the frame 21 of the optical plug 12 pushes against the tip end surface of the frame 19 of the optical jack 15 regardless of the presence or absence of the lock means, so that the frame 21 of the optical plug 12 retreats against the spring force of the spring mechanism 33. The engaged state of the locking hooks 20 with the hook locking portions 22 of the sliders 23 is held by its counterforce. Therefore, the package substrate 18 does not have to be pushed continuously toward the backplane 17.

When the connected state illustrated in FIG. 4 is released, the procedure described above should be performed in the reversed sequence. In this case, force, which releases the engaged state of the locking hooks 20 with the hook locking portions 22 of the sliders 23, needs to be applied to the package substrate 18. Specifically, after the coupled state between the backplane 17 and the package substrate 18 due to the lock means is released, the package substrate 18 is pulled so as to be separated from the backplane 17. As a result, the cam blocks 26 integrated with the hook locking portions 22 of the sliders 23 ride over the cam followers 27 again to return the sliders 23 to the initial position and to elastically deform the tip end sides of the locking hooks 20 outside, so that the locked state with the hook locking portions 22 is released.

Figure 8:
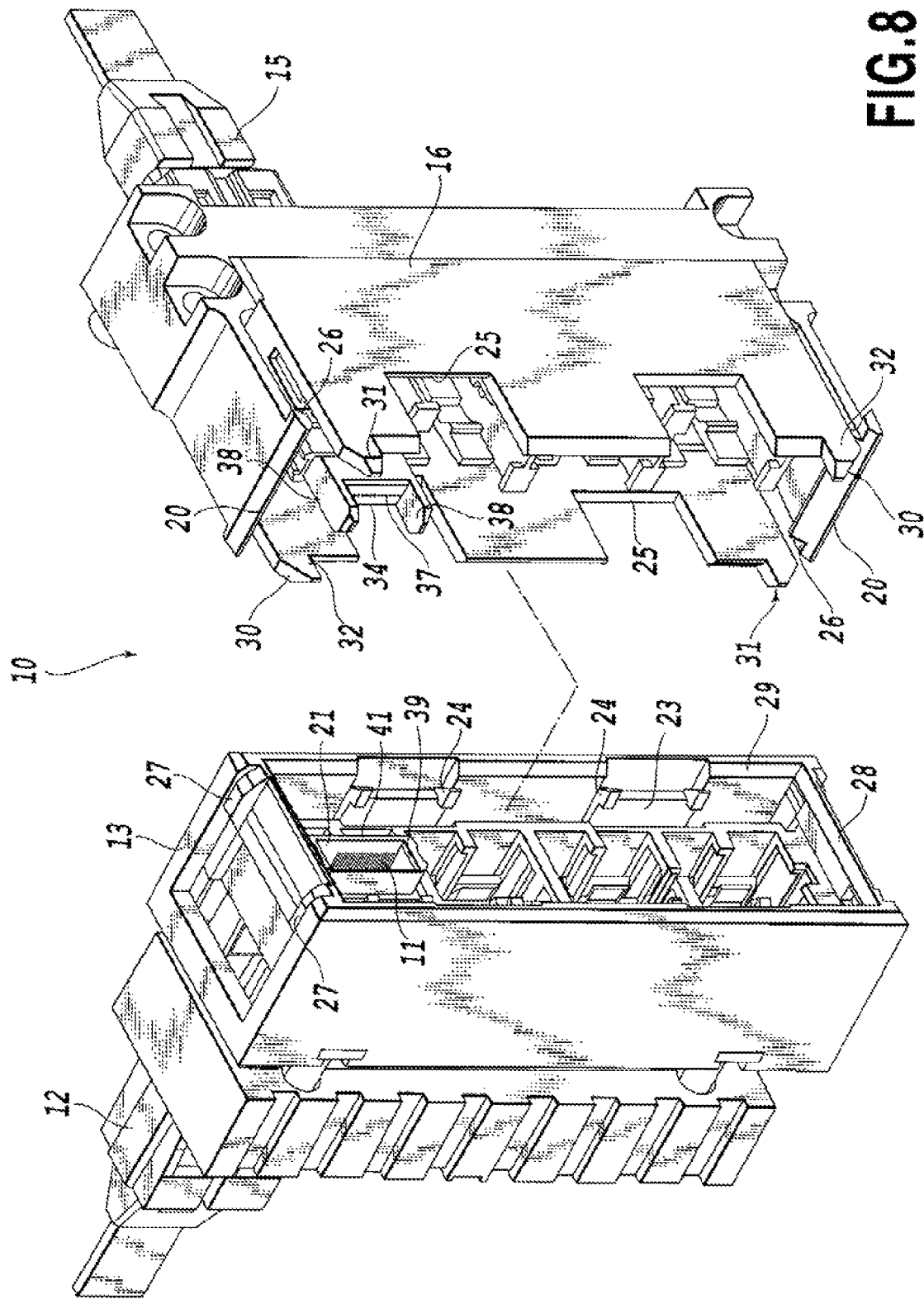
FIG. 8 is an isometric view illustrating an appearance of an optical connector according to another embodiment of the present invention and shows a separated state.
Figure 9:
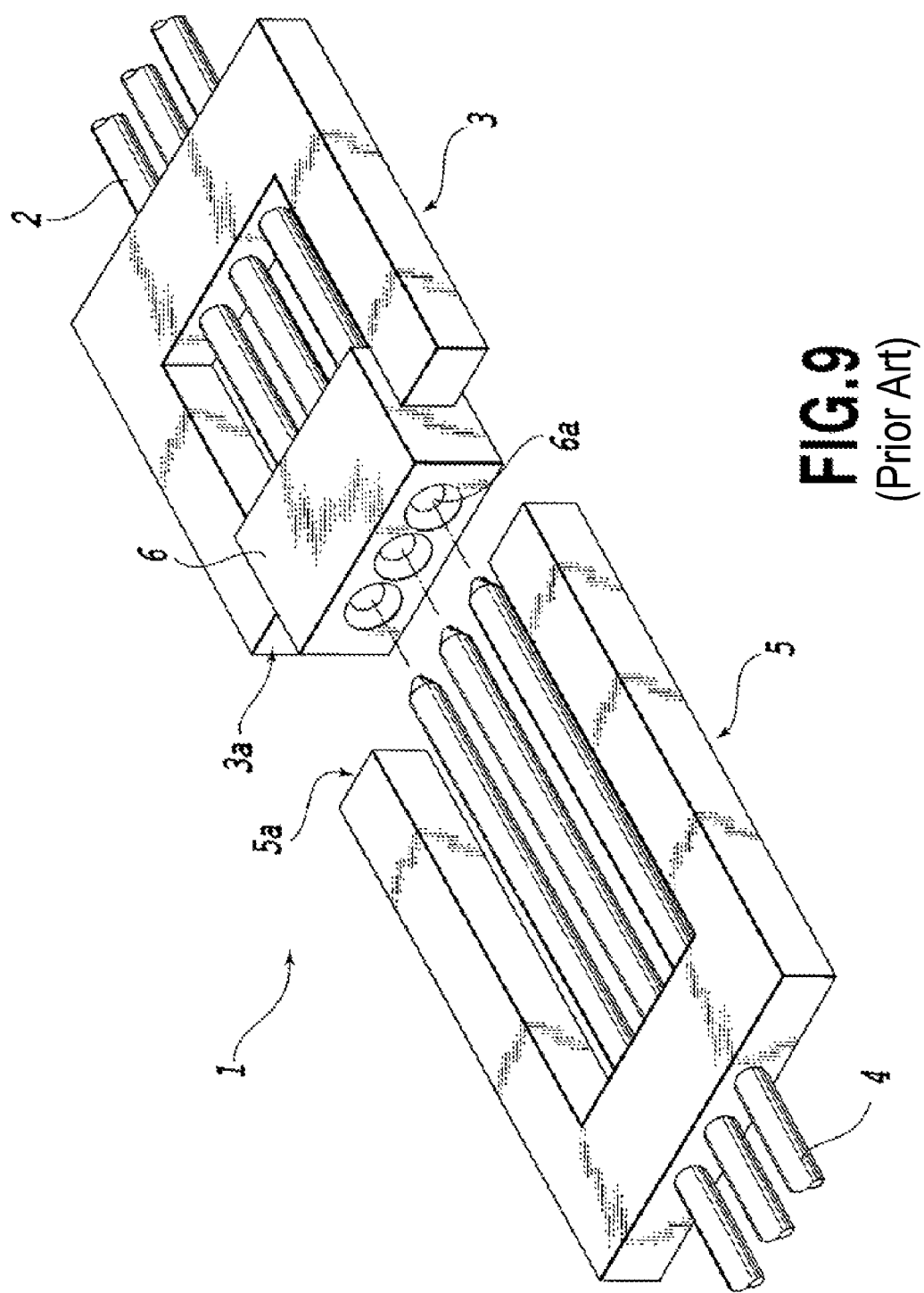
FIG. 9 is an isometric view schematically illustrating the principle of a FPC connector as a target of the present invention and shows a separated state.
Figure 10:
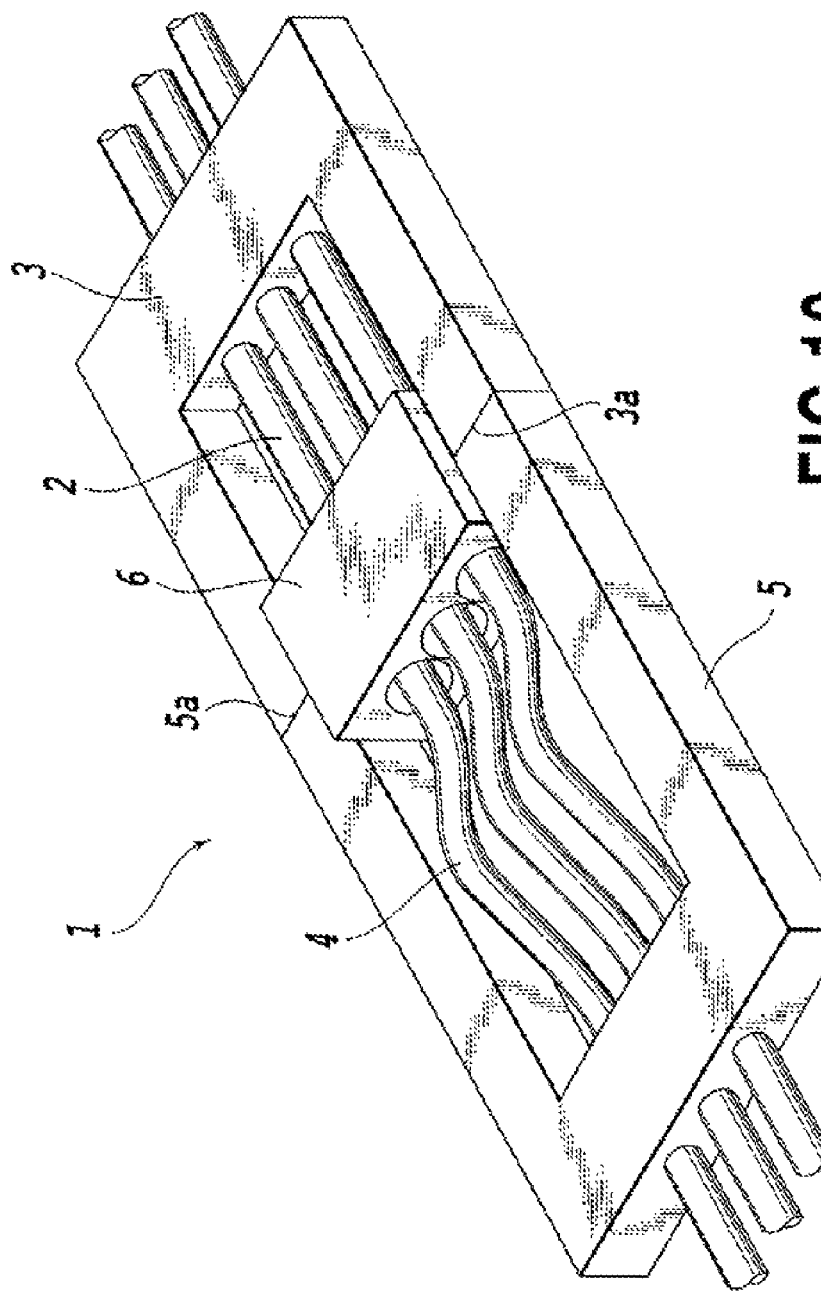
FIG. 10 is an isometric view schematically illustrating the principle of the FPC connector as the target of the present invention and shows a connected state.
Figure 11:
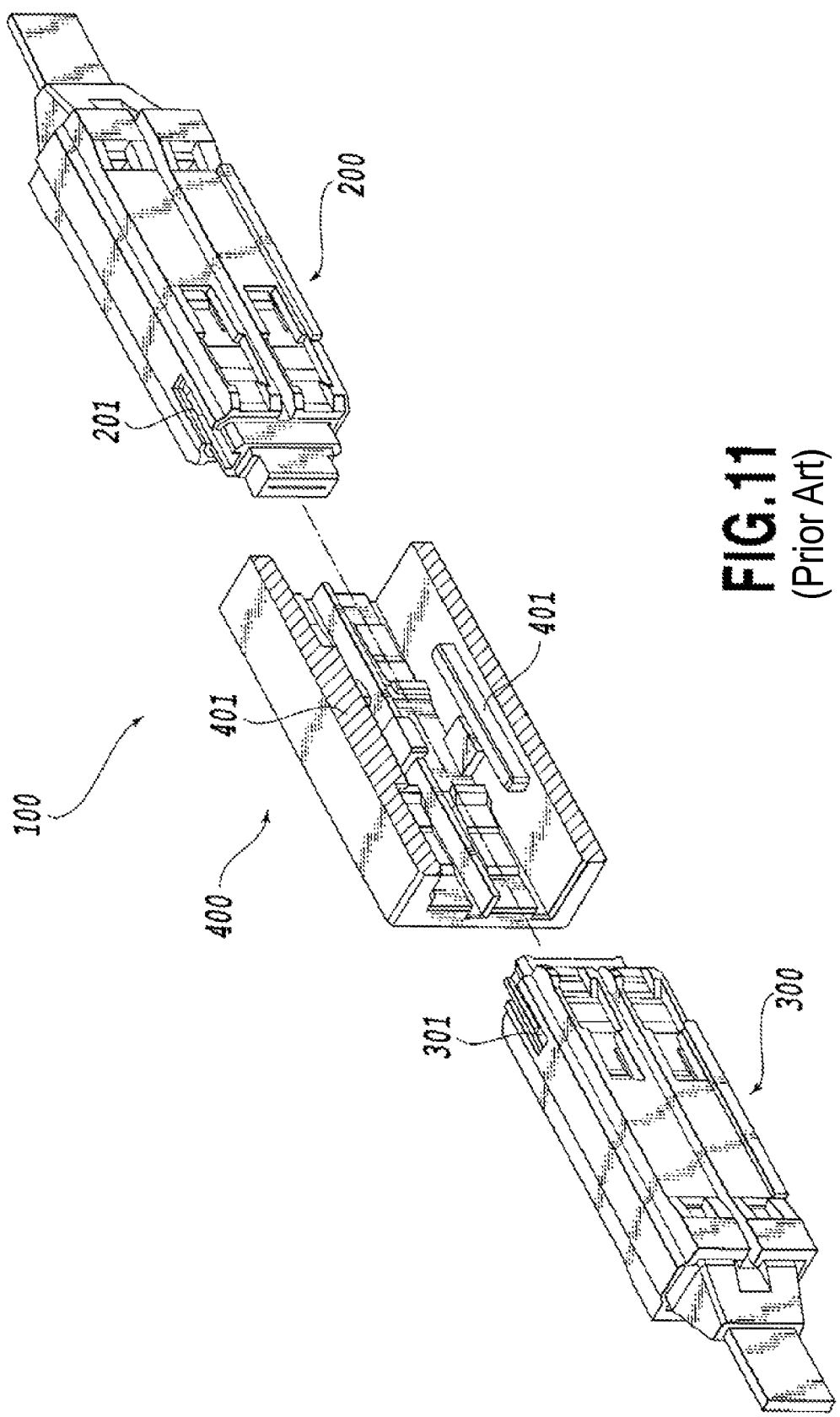
FIG. 11 is an isometric view illustrating an appearance of multi-core optical connector as one example of a conventional multi-core optical connector in a partially broken state and shows a separated state.

In the above-described embodiment, one optical plug 12 and one optical jack 15 can be connected to one plug housing 13 and one jack housing 16, respectively. However, multiple optical plugs 12 and optical jacks 15 can be connected to one plug housing 13 and one jack housing 16. FIG. 8 illustrates such an appearance of another embodiment of the present invention. In this embodiment, four optical plugs 12 and four optical jacks 15 can be attached to the plug housing 13 and the jack housing 16. When the optical plugs 12 to which 16-core optical fibers are attached as well as the optical jacks 15 are used, it is possible to achieve high-density 64-core PC optical fiber connection.

It is noted that the present invention should be interpreted on the basis of only the content described in the claims, and all changes and modifications included in the concept of the present invention but not mentioned above can be made on the aforementioned embodiments. Namely, all the contents described in the aforementioned embodiments do not limit the present invention, and any change, including all configurations which do not directly relate to the present invention, may be made as appropriate according to the use and purpose thereof.

The invention claimed is:
1. An optical connector comprising:
an optical plug to which a first optical fiber is connected;
a plug housing to which the optical plug is removably attached;
an optical jack to which a second optical fiber is connected, the second optical fiber being coupled with the first optical fiber in a butting state; and a jack housing to which the optical jack is removably attached, the jack housing being detachably connected to the plug housing, wherein the optical plug includes a box-shaped frame that houses a coupling end portion of the first optical fiber in a surrounding manner, wherein the optical jack includes a connection block having a connection hole which houses and holds a coupling end portion of the second optical fiber on a base end side thereof, the first optical fiber being inserted from a tip end side of the connection hole, and wherein the optical plug includes a space for allowing bending of the first optical fiber when the first optical fiber and the second optical fiber are coupled to each other, the space being provided between the box-shaped frame of the optical plug and the coupling end portion of the first optical fiber, the optical connector further comprising:

housing position correction means provided in the plug housing and the jack housing, for correcting displacement of relative positions therebetween;

housing connection means provided in the plug housing and the jack housing, for connecting the plug housing with the jack housing by engaging each other so that a coupling state between the first optical fiber and the second optical fiber is maintained;

connection release means formed in at least one of the plug housing and the jack housing, for releasing the connected state by the housing connection means; and frame position correction means provided in an inner side of the frame of the optical plug and on the connection block of the optical jack, for correcting displacement of relative positions therebetween.

2. The optical connector as claimed in claim 1, wherein a facing interstice between the housing position correction means of the plug housing and that of the jack housing is set to be shorter than a facing interstice between the frame position correction means of the optical plug and that of the optical jack.

3. The optical connector as claimed in claim 1, wherein the optical jack further includes:

a frame which holds the frame position correction means together with the connection block; and positioning means for defining relative positions between the housing position correction means and the frame position correction means of the optical jack.

4. The optical connector as claimed in claim 1, wherein one of the plug housing and the jack housing is fixed to a backplane, and the other is fixed to a board member.

5. The optical connector as claimed in claim 4, wherein the plug housing is fixed to the backplane, and the jack housing is fixed to the board member.

6. The optical connector as claimed in claim 2, wherein the optical jack further includes:

a frame which holds the frame position correction means together with the connection block; and positioning means for defining relative positions between the housing position correction means and the frame position correction means of the optical jack.

7. The optical connector as claimed in claim 2, wherein one of the plug housing and the jack housing is fixed to a backplane, and the other is fixed to a board member.

8. The optical connector as claimed in claim 3, wherein one of the plug housing and the jack housing is fixed to a backplane, and the other is fixed to a board member.

9. An optical connector configured to connect a first optical fiber and a second optical fiber, the optical connector comprising:

a plug housing;

an optical plug attached to the plug housing, the optical plug comprising a box-shaped frame, the optical plug being configured to receive and secure a first optical fiber such that a coupling end portion of the first optical fiber is encircled by the box-shaped frame when the first optical fiber is received and secured within the optical plug;

a jack housing detachably connectable to the plug housing;

an optical jack attached to the jack housing, the optical jack comprising a connection block bounding a connection hole extending through the connection block, the connection hole having a tip end side and a base end side, the optical jack being configured to receive and secure a second optical fiber such that a coupling end portion of the second optical fiber is positioned within the base end side of the connection hole when the second optical fiber is received and secured within the optical jack;

means for correcting the displacement of relative positions between the plug housing and the jack housing, the means for correcting comprising a first portion positioned on the plug housing and a second portion positioned on the jack housing;

means for connecting the plug housing and the jack housing so as to maintain the plug housing and the jack housing in a connected state, the means for connecting comprising a first portion positioned on the plug housing and a second portion positioned on the jack housing, the means for connecting being configured to maintain a coupling state between the first optical fiber and the second optical fiber when the first and second optical fibers are secured within the optical plug and optical jack when the plug housing and jack housing are in the connected state;

means for releasing the plug housing and the jack housing from the connected state, the means for releasing being positioned on at least one of the plug housing and the jack housing;

means for correcting the displacement of relative positions between the frame and the connection block, the means for correcting comprising a first portion positioned on the frame and a second portion positioned on the connection block;

wherein when the first and second optical fibers are respectively received and secured within the optical plug and optical jack, and the jack housing and the plug housing are in the connected state, the frame and the connection block together bound a space, and the coupling end of the first optical fiber is positioned within the tip end side of the connection hole so as to be coupled with the second optical fiber in a butting state such that a portion of the first optical fiber is bent, the bent portion being received within the space bounded by the frame and the connection block.

* * * * *